United States Patent [19]
Gruett

[11] 3,835,708
[45] Sept. 17, 1974

[54] COMBINED LIQUID LEVEL AND TEMPERATURE GAUGE

[75] Inventor: Donald G. Gruett, Manitowoc, Wis.

[73] Assignee: Oil-Rite Corporation, Manitowoc, Wis.

[22] Filed: July 21, 1972

[21] Appl. No.: 273,988

[52] U.S. Cl. .................................... 73/292, 73/344
[51] Int. Cl. ............................................ G01f 23/02
[58] Field of Search ............................. 73/292, 328

[56] References Cited
UNITED STATES PATENTS

| | | | |
|---|---|---|---|
| 827,713 | 8/1906 | DelMar | 73/328 |
| 1,359,958 | 11/1920 | Brown | 73/328 |
| 1,989,167 | 1/1935 | Dohrmann | 73/323 X |
| 2,045,507 | 6/1936 | Woodruff | 73/292 |
| 3,455,163 | 7/1969 | Lukas et al. | 73/328 |
| 3,540,276 | 11/1970 | Lyden | 73/328 |
| 3,572,120 | 3/1971 | Lukas et al. | 73/292 |

Primary Examiner—Richard C. Queisser
Assistant Examiner—Daniel M. Yasich
Attorney, Agent, or Firm—Andrus, Sceales, Starke & Sawall

[57] ABSTRACT

The combined liquid level and temperature gauge of this invention includes an assembly of opposed hollow end members having a tubular sight member interposed therebetween and communicating therewith. The assembly is secured together by means disposed interiorly of the sight member and connecting the opposed end members. The lower of the end members is adapted to house a thermometer unit having a sensing stem disposed in a well which projects rearwardly from the end member into the tank. Fastener means connect at least the lower of the end members to the tank for mounting the gauge assembly onto the tank and placing the liquid contents of the tank in communication with the sight member.

2 Claims, 5 Drawing Figures

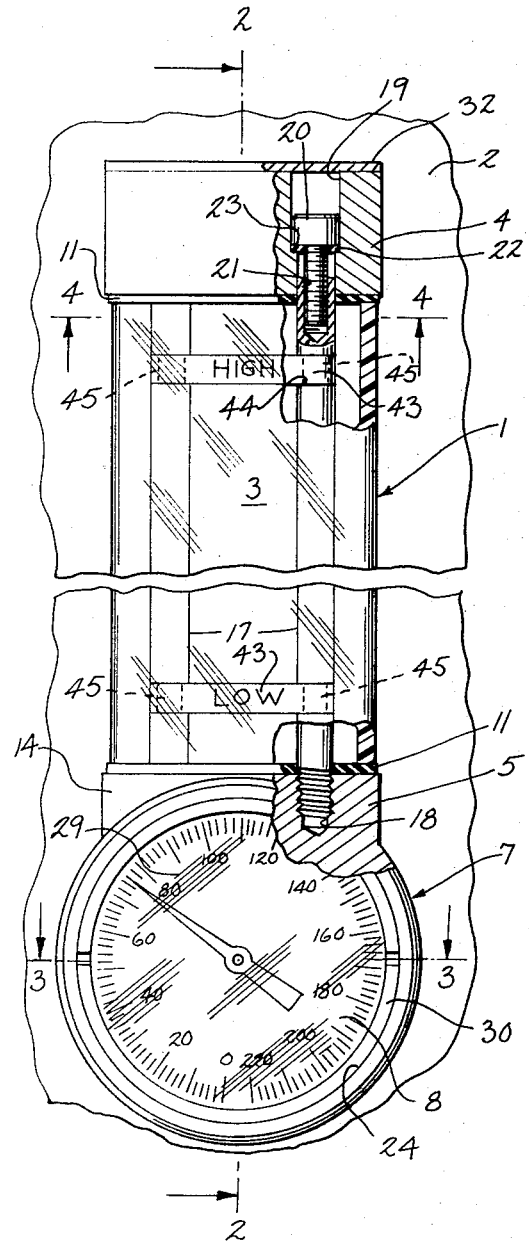
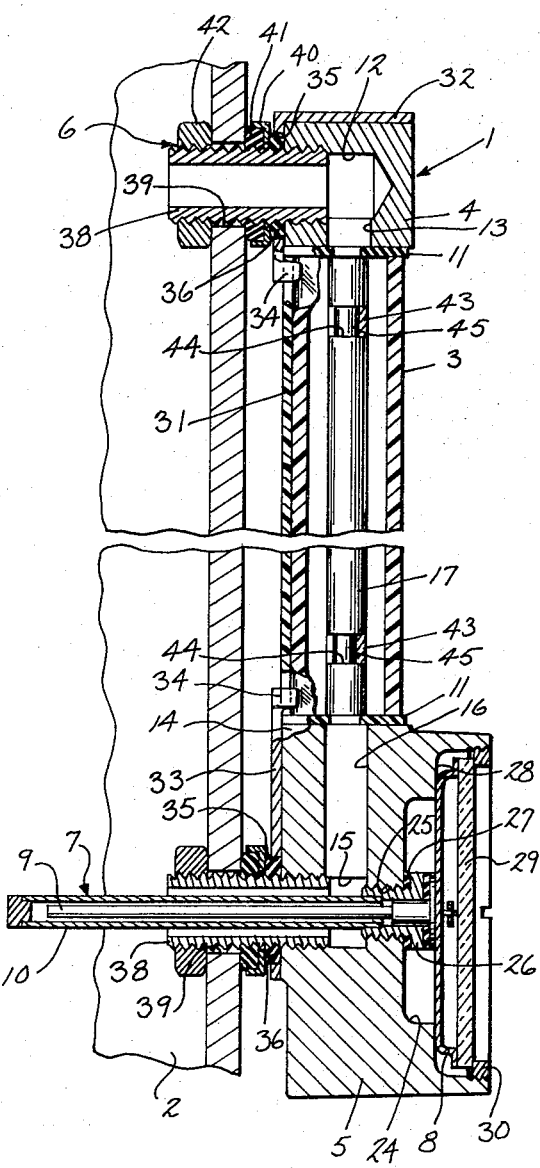
Fig. 1
Fig. 2

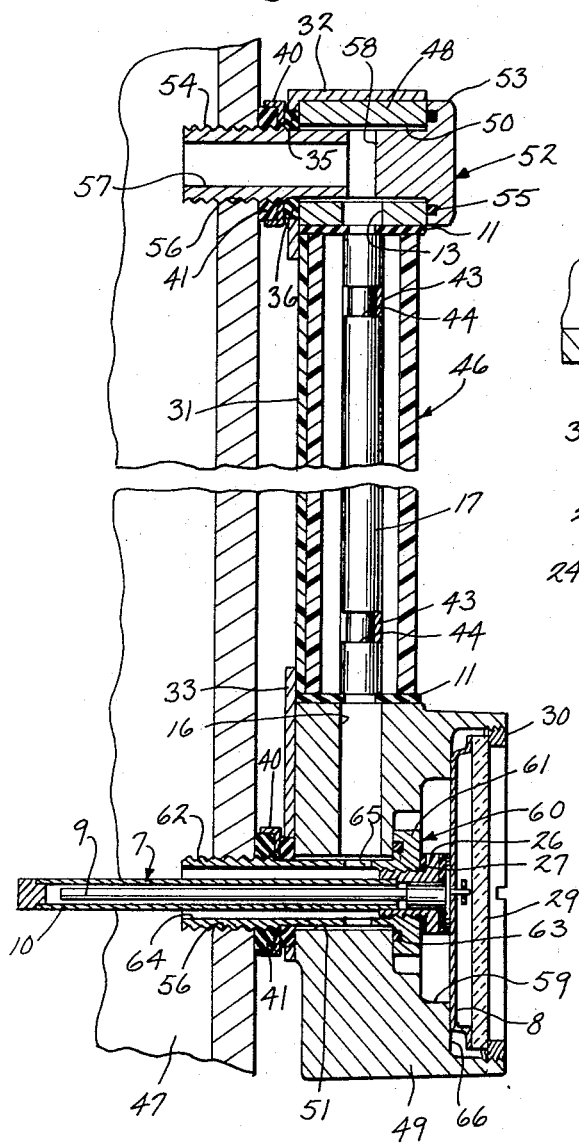
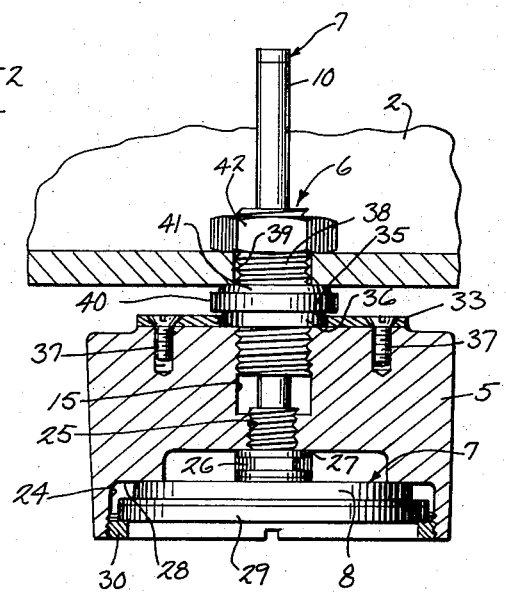
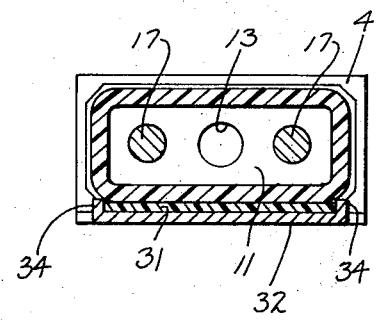

COMBINED LIQUID LEVEL AND TEMPERATURE GAUGE

NATURE AND SUMMARY OF THE INVENTION

This invention relates to a combination gauge for indicating the level and temperature of the liquid contents of a tank or other reservoir.

Generally the combination gauge comprises a pair of opposed hollow end members having a tubular sight member disposed therebetween and communicating therewith. Means are disposed interiorly of the sight member for connecting the opposed end members to thereby unite the end members and sight member into the gauge assembly. Fastener means connect at least the lower of the end members to a tank for mounting the gauge onto a tank and placing the liquid contents of the tank in communication with the sight member. The lower end member is adapted for housing a thermometer unit having a temperature indicating head portion and a rearwardly extending sensing stem. The thermometer unit is retained in the end member with the sensing stem thereof disposed in a well which projects rearwardly from the end member into the tank.

DESCRIPTION OF THE DRAWING FIGURES

The drawings furnished herewith illustrate the best mode presently contemplated for the invention and are described hereinafter.

In the drawings:

FIG. 1 is a front elevation of a back mounted liquid level gauge with thermometer embodying the invention with parts broken away and sectioned;

FIG. 2 is a sectional view taken generally on line 2—2 of FIG. 1;

FIG. 3 is a sectional view taken generally on line 3—3 of FIG. 1;

FIG. 4 is a sectional view taken generally on line 4—4 of FIG. 1; and

FIG. 5 is a sectional view generally similar to that of FIG. 2 and shows the gauge of this invention as adapted for front mounting.

DESCRIPTION OF THE ILLUSTRATED EMBODIMENTS

Referring to the drawings, the combined liquid level and temperature gauge 1 of this invention is shown back mounted on a tank 2 and serves to provide a visible indication of the temperature and level of the liquid contents in the tank within the range of the gauge.

The gauge 1 generally includes a tubular sight member 3 which is interposed between and communicates with spaced upper and lower hollow end members 4 and 5. Fastening means 6 associated with the respective end members 4 and 5 mount the gauge 1 on the tank 2 and are adapted to place the liquid contents of the tank in communication with the gauge. The gauge 1 further includes a dial thermometer 7 having a head portion 8 housed within the lower end member 5 and a rearwardly projecting sensor stem 9 disposed in a well 10 that projects rearwardly from the end member into the tank 2.

The tubular sight member 3 is of a rigid transparent plastic material such as a polycarbonate, polysulphon or polyamide and may be made by an extrusion process. The sight member 3 is generally rectangular in section having a greater dimension in width than in depth. While the sight member 3 as assembled into the gauge 1 and mounted on a tank 2 is viewable from the front and either side, its substantial width provides for frontal viewing from some considerable distance.

The upper end of the tubular sight member 3 is closed off by the upper end member 4 with a suitable gasket 11 interposed therebetween. The end member 4 comprises a block-like structure having a horizontal bore 12 generally centrally thereof and which opens rearwardly to provide for communication with the tank 2. A vertical bore 13 intersects with the horizontal bore 8 and opens downwardly to place the sight member 3 in communication with the latter. The intersecting bores 8 and 9 characterize the end member 4 as being generally hollow.

The sight member 3 is closed at its lower end by the lower end member 5 with a gasket 11 disposed therebetween. End member 5 generally comprises a cylindrical casting formed with an upwardly extending peripheral projection 14 forming a base adapted for engagement with the lower end of the sight member 3. The member 5 may be characterized as being generally hollow by virtue of the intersecting horizontal and vertical bores 15 and 16 for placing the tank 2 in communication with the sight member 3. The axis of the horizontal bore 15 is disposed generally coincident with the fore-and-aft extending axis of the cylindrical member 5 and opens rearwardly thereof. The vertical bore 16 extends radially upwardly and opens from the projection 14 into the sight member 3.

The gauge assembly 1 comprising the opposed end members 4 and 5 with the intermediate sight member 3 is secured together by a pair of transversely spaced tie rods or posts 17 which extend vertically interiorly of the sight member. The posts 17 are threaded at their lower end for threaded engagement within the vertical openings 18 spaced generally equidistantly on opposite sides of the vertical bore 16 of the lower end member 5.

The upper end member 4 is provided with vertically extending stepped bores 19 which are generally vertically aligned with the openings 18 of the lower end member 5, and the upper end of the posts 17 extend into the lesser diameter lower portion of the bores 19. The larger diameter upper portion of the bores 19 open upwardly of the end members 4 and are adapted to receive the cap screws 20 which threadedly engage into the internal openings 21 provided in the upper end of the respective posts 17. A nylon sealing washer 22 is disposed on the respective cap screws 20 and is seated against the upwardly facing shoulder 23 formed between the stepped bore portions. With the shoulder 23 providing a bearing for the respective cap screws 20, the corresponding posts 17 are drawn upwardly relative to the screws to thereby draw the opposed end members 4 and 5 tightly against the corresponding ends of the sight member 3 and thus sealingly compress the gaskets 11 therebetween.

The cylindrical portion of end member 5 projects forwardly beyond the projection 14 to provide a housing for the head 8 of the dial thermometer 7. The end member 5 is provided with a stepped cylindrical recess 24 which opens forwardly to receive the thermometer 7 and its well 10. The well 10 is inserted into the threaded opening 25 at the base of the recess 24 and extends coaxially through the horizontal bore 15 and projects rearwardly from the end member 5. The well 10 is externally threaded forwardly thereof to threadedly engage within the opening 25. When the well 10 is secured in the assembly, the head 26 thereof is seated against the base of the recess 24 with a suitable sealing washer 27 compressed therebetween.

The thermometer 7 is received in the stepped recess 24 with the sensing stem 9 disposed in the well 10 and the dial head 8 disposed in abutting relation with the forwardly facing shoulder 28. The dial face of the thermometer head 8 is protected by a transparent shield or cover 29 which is engaged forwardly by an externally threaded retaining ring 30 threadedly engaged within the forward end of recess 24 to secure the thermometer 7 and its cover in the gauge assembly 1.

The gauge assembly 1 further includes a reflector 31 generally corresponding in length to and disposed behind the sight member 3 to enhance visibility of the liquid level as viewed from the front of the gauge. The reflector means or background member 31 is secured between vertically spaced brackets 32 and 33 which in turn are secured to the corresponding end members 4 and 5.

The lower bracket member 33 is generally flat and overlies at least a portion of the rear face of the end member 5. The bracket 33 projects upwardly beyond the end member 5 to overlie at least the lower end portion of the reflector 31 to confine the latter in the fore-and-aft direction. Above the end member 5, the bracket 33 is provided with transversely spaced tabs 34 which are crimped forwardly to transversely confine the reflector 31. Bracket 33 extends beneath the horizontal bore 15 and is further provided with a circular hole 35 which is larger than and concentric with the bore 15. An O-ring seal 36 is disposed in the hole 35 and seated against the rear face of the end member circumferentially of the bore 15 with the bracket 33 providing for radial confinement of the seal. Suitable threaded members 37 disposed on opposite sides of the hole 35 secure the bracket 33 to the end member 5 as generally shown in FIG. 3.

The upper bracket member 32 generally comprises an angle member which overlies the rear and upper faces of the upper end member 4. The portion of bracket member 32 which overlies the rear face of end member 4 projects downwardly beyond the end member to overlie at least the upper end portion of the reflector 31. Reflector 31 is further confined by the transversely spaced, forwardly crimped tabs 34 on the bracket 32 beneath the end member 4. Similarly to lower bracket 33, the bracket 32 includes a hole 35 for receiving and confining an O-ring seal 36 circumferentially of the horizontal bore 12 of end member 4. Bracket member 32 is secured to the rear face of end member 4 by threaded members 37 disposed on opposite sides of the hole 35. The portion of bracket member 32 which extends over or overlies the upper face of the end member 4 serves to cover or close the entrances to the stepped bores 19 and render the screws 20 generally inaccessible to thereby preclude possible mischievous tampering when the gauge 1 is in service on a tank 2.

Hollow studs 38 are utilized to mount the gauge 1 onto the tank 2. One end of the studs 24 are threaded into the respective horizontal bores 12 and 15 in the end members 4 and 5. The opposite end of the studs 38, which project rearwardly from the respective end members 4 and 5, are disposed in suitable vertically spaced holes 39 provided in the wall of the tank 2. If the wall of the tank 2 intermediate the vertically spaced holes 39 includes an outwardly projecting weld bead, not showing, or is otherwise rough or uneven, spacer elements 40 may be interposed between the tank 2 and the gauge 1. The spacer elements 40 include a radial flange which engages the O-ring seal 36 forwardly and seats a somewhat larger O-ring seal 41 for engagement rearwardly with the wall of the tank 2. For a tank 2 having a generally smooth wall, the spacer elements 40 together with seals 41 may be omitted and the gauge 1 may be generally flush mounted with the O-ring seals 36 bearing against the tank wall. In either case, a nut 42 is threaded onto the ends of the studs 38 which project through the holes 39 and into the tank 2 to secure the gauge 1 relative to the tank. The mounting arrangement provides for liquid entry to the gauge 1 and the venting of any displaced air to effect a quick level response in the gauge.

If desired, bands 43 carrying "high" and "low" level markings may be mounted across the rods or posts 17 internally of the gauge 1. The bands 43 may be supported by transversely aligned shoulders 44 formed by the reduced sections 45 on the respective posts 17.

Referring now to the embodiment of FIG. 5, the gauge 46 is adapted for front mounting onto the tank 47. In the gauge 46 the sight member 3 is secured between the opposed end members 48 and 49 by the rods or posts 17 which provide for necessary compression on the sealing gaskets 11. The end members 48 and 49 of the gauge 46 are provided with corresponding horizontal through bores 50 and 51 which intersect with the respective vertical bores 13 and 16. The gauge 46 is shown to include a reflector 31 secured to the gauge by the vertically spaced bracket members 32 and 33 as hereinbefore described.

For mounting the upper end of the gauge 46, a bolt 52 having a head 53 and a threaded hollow shank portion 54 is disposed in the horizontal hollow through bore 50 with the head thereof engaging the front face of the end member 48 and the shank portion thereof projecting rearwardly from the end member. The head 53 of bolt 52 carries a recessed O-ring 55 for engaging the front face of end member 48 circumferentially of the bore 50 to seal the forward end of the bore. Rearwardly the shank portion 54 of bolt 52 is threadedly engaged within the upper of the vertically spaced tapped holes 56 provided in the tank 47. The axial bore 57 in the bolt shank portion 54 is intersected by the cross bore 58 to provide for flow communication between the tank 47 and the corresponding through bore 50 and hence with the sight member 3 of the gauge 46.

In the lower end member 49, the horizontal through bore 51 opens forwardly into the recess 59. A hollow bolt 60 having a head 61 and threaded shank portion 62 is disposed in the bore 51 of end member 49 with head thereof engaging the base of the recess 59 and the shank portion projecting rearwardly from the end member for threaded engagement within the lower of the tapped holes 56 provided in tank 47. A recessed O-ring 63 is provided in the head 61 of bolt 60 for engaging with the base of the recess 59 circumferentially of the bore 51 to seal the forward end of the bore. The bolt 60 is provided with an axial through bore 64 which is intersected by the cross bore 65 to provide for communication between the bores 64 and 51 and hence between the tank 47 and sight member 3 of the gauge 46. At the head end of bolt 60, the bore 64 is threaded to provide for threaded engagment of the well 10 at the forward end of the bore with the head 26 of the well sealingly compressing the sealing washer 27 against the head 61 of the bolt. The dial thermometer 7 is disposed in the recess 59 of end member 49 with its sensing stem 9 extending into the well 10 and its head 8 abutting against shoulder 66 where the thermometer is secured by the retaining ring 30.

The gauges 1 and 46 provide for closed circuit communication with the tank giving visible indication of the liquid level in the tank within the range of the gauge and of the temperature of the liquid contents. If for any reason the thermometer 7 must be removed from the gauges 1 and 46, such a disassembly is relatively simple and in no way affects or disturbs the ability of the gauge to continue to provide indications of liquid level in the tank.

Various modes of carrying out the invention are contemplated as being within the scope of the following claims, particularly pointing out and distinctly claiming the subject matter which is regarded as the invention.

I claim:

1. A gauge assembly for indicating the level and temperature of the liquid in a tank, comprising a pair of vertically spaced hollow end members, a tubular sight member releasably and sealingly mounted between and communicating with the end members, means vertically disposed within the sight member and connecting the spaced end members to unite the end members and sight member of the gauge assembly, the lower of said end members being enlarged relative to the upper end member and having a horizontal bore which opens rearwardly and a cylindrical recess generally axially aligned with said bore and communicating therewith and which has an outlet forwardly, said recess of said lower end member being stepped to provide a forwardly facing radial shoulder spaced from the outlet, hollow fastener means disposed within the horizontal bore of the lower end member and adapted for connection to a tank for mounting the gauge assembly and placing the liquid contents of a tank in communication with the sight member, a well disposed generally coaxially of said horizontal bore and hollow fastener and adapted to project rearwardly into a tank, said well opening forwardly into the recess and serving to preclude flow communication between the bore and the recess, a thermometer unit having a sensing stem disposed in the well and a head portion disposed in the recess in engagement with the radial shoulder, said thermometer head portion having an exposed temperature indicating dial face disposed forwardly, a transparent shield member disposed in the recess and providing a protective cover for the otherwise exposed dial face of the thermometer unit, and a lock ring threadedly engaged in the outlet of the recess to retain the thermometer unit and shield member in the recess and corresponding well.

2. A gauge assembly for indicating the level and temperature of the liquid in a tank, comprising a vertically disposed sight member for indicating the liquid level, a pair of vertically spaced end members releasably and sealingly mounted to close the respective ends of the sight member, said lower end member being enlarged relative to the upper end member and having a horizontal bore which opens rearwardly and a vertical bore which intersects the horizontal bore and opens into the sight member to place the horizontal bore in communication with the sight member, said lower end member further including a recess generally axially aligned with said horizontal bore and communicating therewith and which has an outlet forwardly, said recess being stepped to provide a forwardly facing radial shoulder spaced from the outlet, hollow fastener means disposed within the horizontal bore of the lower end member and adapted for connection to a tank for mounting the gauge assembly and placing the liquid contents of a tank in communication with the sight member, a well disposed generally coaxially of said horizontal bore and hollow fastener and adapted to project rearwardly into a tank, said well opening forwardly into the recess and serving to preclude flow communication between the bore and the recess, a thermometer unit having a sensing stem disposed in the well and a head portion disposed in the recess in engagement with the radial shoulder, said thermometer head portion having a temperature indicating dial face disposed forwardly, a transparent shield member disposed in the recess and providing a protective cover for the dial face of the thermometer unit, and a lock ring disposed in the outlet of the recess to retain the thermometer unit and shield member in the recess and corresponding well.

* * * * *